(12) United States Patent
Imade et al.

(10) Patent No.: US 10,346,545 B2
(45) Date of Patent: Jul. 9, 2019

(54) METHOD, DEVICE, AND RECORDING MEDIUM FOR PROVIDING TRANSLATED SENTENCE

(71) Applicant: Panasonic Intellectual Property Management Co., Ltd., Osaka (JP)

(72) Inventors: Masahiro Imade, Osaka (JP); Masaki Yamauchi, Osaka (JP); Nanami Fujiwara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 15/697,491

(22) Filed: Sep. 7, 2017

(65) Prior Publication Data

US 2018/0089180 A1   Mar. 29, 2018

(30) Foreign Application Priority Data

Sep. 27, 2016  (JP) .................................. 2016-188456
May 24, 2017  (JP) .................................. 2017-102876

(51) Int. Cl.
*G06F 17/28* (2006.01)
*G06F 16/242* (2019.01)
(Continued)

(52) U.S. Cl.
CPC ........ *G06F 17/2836* (2013.01); *G06F 16/243* (2019.01); *G06F 16/3337* (2019.01); *G06F 17/271* (2013.01); *G06F 17/2818* (2013.01)

(58) Field of Classification Search
None
See application file for complete search history.

(56) References Cited

U.S. PATENT DOCUMENTS 6,356,865 B1 * 3/2002 Franz ..................... G10L 15/26
704/2
7,047,195 B2 * 5/2006 Koizumi ............. G06F 17/2836
704/260

(Continued)

FOREIGN PATENT DOCUMENTS

JP   2007-047976   2/2007
JP   2012-159969   8/2012

*Primary Examiner* — Neeraj Sharma
(74) *Attorney, Agent, or Firm* — Greenblum & Bernstein, P.L.C.

(57) ABSTRACT

A method for providing a translation, including: acquiring a first sentence in a first language via a user terminal; determining whether the first sentence is in a database including sentences in the first language and corresponding translations in a second language; if the first sentence is not in the database, generating second sentences by replacing one or more words in the first sentence, based on a predetermined rule; calculating respective degrees of coincidence for syntax between the second sentences and sentences in the first language included in the database; extracting third sentences in the first language which are included in the database and for which the calculated degree of coincidence is at least a threshold value; and displaying fourth sentences in the second language which are corresponding translations for the third sentences in the database, on the user terminal as corresponding translation references for the first sentence.

14 Claims, 10 Drawing Sheets

(51) Int. Cl.
*G06F 16/33* (2019.01)
*G06F 17/27* (2006.01)

(56) References Cited

U.S. PATENT DOCUMENTS

| | | | | |
|---|---|---|---|---|
| 9,336,206 | B1* | 5/2016 | Orsini | G06F 17/2854 |
| 9,600,474 | B2* | 3/2017 | Cuthbert | G06F 17/289 |
| 9,613,026 | B2* | 4/2017 | Hodson | G06F 17/28 |
| 9,613,027 | B2* | 4/2017 | Hwang | G06F 17/28 |
| 9,753,976 | B1* | 9/2017 | Adogla | G06F 16/243 |
| 2004/0216050 | A1* | 10/2004 | Ono | G06F 17/289 |
| | | | | 715/264 |
| 2008/0077391 | A1* | 3/2008 | Chino | G06F 17/2827 |
| | | | | 704/7 |
| 2014/0229155 | A1* | 8/2014 | Leydon | G06Q 30/0217 |
| | | | | 704/2 |
| 2014/0350913 | A1* | 11/2014 | Cheng | G06F 17/289 |
| | | | | 704/2 |
| 2016/0162478 | A1* | 6/2016 | Blassin | G06Q 10/06311 |
| | | | | 706/12 |

* cited by examiner

FIG. 6

| EXAMPLE SENTENCE | A2[%] | A3[%] | A4[%] | | | OVERALL EVALUATION VALUE [%] |
|---|---|---|---|---|---|---|
| | | | A | B | C | |
| (1) | 100.0 | 36.8 | 87.0 | 61.1 | 63.3 | 12.4 |
| (2) | 100.0 | 41.1 | 67.4 | 71.6 | 55.1 | 10.9 |
| (3) | 100.0 | 61.8 | 44.2 | 44.9 | 37.0 | 4.5 |
| (4) | 50.0 | 55.8 | 39.1 | 42.1 | 44.9 | 2.1 |

H1

METHOD, DEVICE, AND RECORDING MEDIUM FOR PROVIDING TRANSLATED SENTENCE

BACKGROUND

1. Technical Field

The present disclosure relates to a technique for translating an input sentence.

2. Description of the Related Art

In recent years, research has been actively carried out into presenting a user with many kinds of translation results rather than simply presenting a machine translation result for an input sentence when translating the input sentence.

For example, Japanese Unexamined Patent Application Publication No. 2012-159969 discloses a technique in which a plurality of paraphrased sentences obtained by paraphrasing an input text sentence with other phrasings having the same content are generated, the generated paraphrased sentences are machine-translated, candidates for paraphrased sentences to be translated are extracted based on translation reliability from among the generated paraphrased sentences, and paraphrased sentences to be translated are specified from among the extracted paraphrased sentences to be translated.

Japanese Patent No. 5103718 discloses a technique in which, in order to compensate for the uncertainty of a machine translation, an example sentence having a phrasing that is close to that of an input original sentence is retrieved, corresponding translated text in a target language corresponding to the retrieved example sentence is acquired, and the corresponding translated text acquired is displayed together with a machine translation result for the input original sentence.

SUMMARY

However, the aforementioned prior techniques have a problem in that an improvement in translation reliability cannot be expected unless the knowledge space provided in a translation device is enhanced; thus, further improvement is required.

In one general aspect, the techniques disclosed here feature a method for providing a translated sentence, the method including: acquiring a first sentence written in a first language which is to be translated, via a terminal of a user; determining whether the first sentence is included in a database including a plurality of pairs of sentences written in the first language and corresponding translated sentences written in a second language; in a case where it is determined that the first sentence is not included in the database, generating a plurality of second sentences obtained by replacing one or more words making up the first sentence, on the basis of a predetermined rule; calculating respective degrees of coincidence for syntax between the plurality of second sentences and a plurality of sentences written in the first language which are included in the database; extracting one or more third sentences written in the first language which are included in the database and for which the calculated degree of coincidence is equal to or greater than a threshold value; and displaying one or more fourth sentences written in the second language which are corresponding translated sentences for the one or more third sentences in the database, on the terminal of the user as corresponding translation references for the first sentence.

These general and specific aspects may be implemented using a system, a method, and a computer program, and any combination of systems, methods, and computer programs.

According to the present disclosure, translation results that are useful to the user can be presented without having to enhance a knowledge space in order to generate a translated sentence for an input sentence or a sentence similar thereto with a high degree of reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a table in which specific examples in the present embodiment have been gathered;

Figure 1:
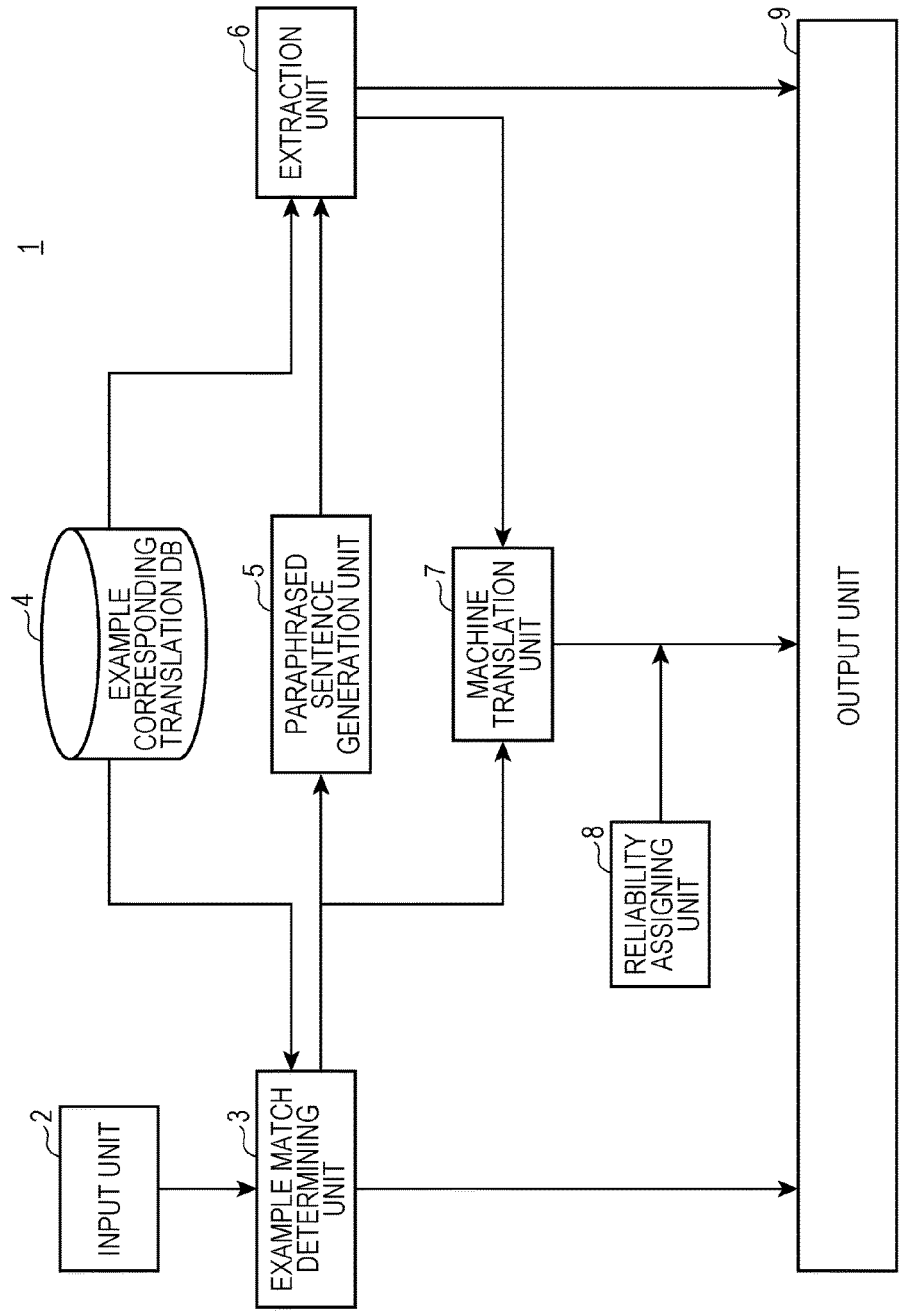
FIG. 1 is a block diagram depicting a configuration of a translation support device that is an example of a device according to an embodiment of the present disclosure.

DETAILED DESCRIPTION (Underlying Knowledge Forming Basis of Aspect of the Present Disclosure)

In order to increase the translation quality of a translation device, a technique has been proposed in which an input sentence is paraphrased, a plurality of paraphrased input sentences are generated, translated sentences for the generated plurality of paraphrased input sentences are presented, and a user is made to select the optimum translated sentence from among the presented translated sentences for the plurality of paraphrased input sentences (Japanese Unexamined Patent Application Publication No. 2012-159969).

Furthermore, a technique has also been proposed in which an example translation result for a sentence that is similar to an input sentence or a sentence that partially matches the input sentence is presented together with a machine translation result (Japanese Patent No. 5103718).

However, the technique of Japanese Unexamined Patent Application Publication No. 2012-159969 has a problem in that it is not possible to present translated sentences having a high degree of accuracy in the case where there is no knowledge data in the vicinity of the input sentence and the paraphrased input sentences in the knowledge space used by the translation device to generate translated sentences.

Furthermore, the technique of Japanese Patent No. 5103718 has a problem in that it is not possible to present example corresponding translations capable of compensating for the uncertainty of a machine translation of an input sentence, if an example corresponding translation database possessed by the translation device does not include example sentences that are similar to the input sentence or example sentences that partially match the input sentence.

In this way, the techniques of Japanese Unexamined Patent Application Publication No. 2012-159969 and Japanese Patent No. 5103718 have a problem in that an improvement in translation reliability cannot be expected unless the knowledge space is enhanced. Furthermore, with the techniques of Japanese Unexamined Patent Application Publication No. 2012-159969 and Japanese Patent No. 5103718, even if the knowledge space is enhanced, an improvement in translation reliability cannot be expected in the case where an input sentence having a phrasing that is beyond the scope of the enhanced knowledge space has been input. Furthermore, enhancing the knowledge space is problematic in terms of cost-effectiveness.

The present disclosure provides a technique for presenting translated sentences that are useful to the user without having to enhance a knowledge space in order to generate translated sentences for an input sentence or a sentence similar thereto with a high degree of reliability.

(1) A method according to an aspect of the present disclosure is a method for providing a translated sentence, the method including:

acquiring a first sentence written in a first language which is to be translated, via a terminal of a user;

determining whether the first sentence is included in a database including a plurality of pairs of sentences written in the first language and corresponding translated sentences written in a second language;

in a case where it is determined that the first sentence is not included in the database, generating a plurality of second sentences obtained by replacing one or more words making up the first sentence, on the basis of a predetermined rule;

calculating respective degrees of coincidence for syntax between the plurality of second sentences and a plurality of sentences written in the first language which are included in the database;

extracting one or more third sentences written in the first language which are included in the database and for which the calculated degree of coincidence is equal to or greater than a threshold value; and displaying one or more fourth sentences written in the second language which are corresponding translated sentences for the one or more third sentences in the database, on the terminal of the user as corresponding translation references for the first sentence.

The present aspect does not simply present translated sentences of paraphrased sentences for the first sentence that is to be translated. More specifically, in the present aspect, one or more sentences, for which the degree of coincidence for syntax is equal to or greater than a threshold value with respect to a plurality of second sentences obtained by replacing a first sentence on the basis of a predetermined rule, are extracted as third sentences from a plurality of sentences written in a first language stored in a database. Then, in the present aspect, fourth sentences which are corresponding translated sentences for the extracted third sentences are presented as corresponding translation references.

Here, despite having different content from the first sentence, when presenting the fourth sentences which are example corresponding translations of the third sentences that have a matching or similar sentence structure to the first sentence, the possibility of being able to present translation results that are useful to the user increases, contrarily, compared to presenting translated sentences of paraphrased sentences for the first sentence.

In other words, when presenting the fourth sentences such as these, the knowledge space employed when generating translated sentences is used in a wide range, and translation results that are useful to the user can be obtained. The present aspect focuses on this point, and therefore translation results that are useful to the user can be presented.

Furthermore, in the present aspect, there is no requirement for translated sentences for the first sentence or a sentence similar thereto to be generated with a high degree of reliability, and it is therefore not necessary to use a knowledge space provided with abundant knowledge data so as to meet said requirement. Consequently, the present aspect is able to present translation results that are useful to the user without having to enhance the knowledge space.

(2) In the aforementioned aspect, one or more second sentences from among the plurality of second sentences may be machine-translated into the second language to generate one or more fifth sentences, and at least any one of the one or more fourth sentences and the one or more fifth sentences may be displayed on the terminal of the user.

In the present aspect, one or more fifth sentences, which are translated sentences for one or more second sentences from among the plurality of second sentences obtained by replacing the first sentence according to the predetermined rule, are generated, and at least any one of the fourth sentences and the fifth sentences is presented. Therefore, by presenting the fifth sentences, a variety of translation results are presented, and the possibility of being able to present translation results that are useful to the user increases.

(3) In the aforementioned aspect, the degrees of coincidence may be calculated based on a first index indicating a degree of textual similarity between the plurality of second sentences and the plurality of sentences included in the database.

According to the present aspect, sentences having a matching or similar degree of textual similarity with respect to the plurality of second sentences are extracted as the third sentences from among the plurality of sentences stored in the database. It is therefore possible to prevent sentences that are unrelated to the plurality of second sentences from being extracted as the third sentences, while also using the knowledge space in a wide range.

(4) In the aforementioned aspect, the degrees of coincidence may be calculated based on a second index indicating a value that increases as the degree of textual similarity with the first sentence decreases, for sentences having a matching or similar sentence structure to the plurality of second sentences, from among the plurality of sentences included in the database.

According to the present aspect, example sentences which are sentences having a matching or similar sentence structure to the second sentences and which have different content to the first sentence are extracted from among the plurality of sentences included in the database. Therefore, a variety of third sentences can be extracted, and the knowledge space can be used in a wide range.

(5) In the aforementioned aspect, the degrees of coincidence may be calculated based on a third index indicating similarity in sentence structure between the plurality of second sentences and the plurality of sentences included in the database.

According to the present aspect, sentences having a matching or similar sentence structure to the plurality of second sentences are extracted as the third sentences. It is therefore possible to prevent third sentences having little relevance to the plurality of second sentences from being extracted, while also using the knowledge space in a wide range.

(6) In the aforementioned aspect, the degrees of coincidence may be calculated based on a fourth index indicating a value that increases as the number of matching parts of speech increases between the plurality of second sentences and the plurality of sentences included in the database.

According to the present aspect, sentences having a high number of matching parts of speech with respect to the plurality of second sentences are extracted as the third sentences. It is therefore possible to prevent sentences having little relevance to the plurality of second sentences from being extracted, while also using the knowledge space in a wide range.

Furthermore, in the present aspect, at least two from among the first to fourth indexes may be combined to calculate an evaluation value. Thus, a greater a variety of third sentences are extracted, and a variety of translation results can be presented. As a result, although the similarity in the first language to the first sentence is low, third sentences with which translation results become hints for translating the first sentence can be extracted.

(7) In the aforementioned aspect, the first index may indicate a value that increases as the number of replaced portions increases in the second sentences.

According to the present aspect, since the first index increases as the number of replaced portions increases in the second sentences, it is possible to extract third sentences that are similar to second sentences having a large number replaced portions, and a greater variety of translation results can be presented.

(8) In the aforementioned aspect, the one or more second sentences may be extracted from among the plurality of second sentences on the basis of a degree of textual similarity between the plurality of second sentences and the one or more third sentences.

According to the present aspect, second sentences that are similar to the third sentences extracted based on a degree of coincidence are extracted from among the plurality of second sentences, and it is therefore possible to prevent second sentences that are unrelated to the first sentence from being extracted, while also using the knowledge space in a wide range.

(9) In the aforementioned aspect, the predetermined rule may be a first paraphrasing rule with which a first word included in a fragment making up the first sentence is paraphrased with a second word having a similar context relation.

According to the present aspect, second sentences are generated with a first word making up the first sentence being paraphrased with a second word having a similar context relation. Therefore, a variety of second sentences can be generated compared to when adopting an aspect in which second sentences simply having the same meaning as the first sentence are generated. As a result, although the similarity in the first language to the first sentence is low, second sentences with which translation results become hints for translating the first sentence can be generated.

(10) In the aforementioned aspect, the predetermined rule may be a second paraphrasing rule with which a first word included in a fragment making up the first sentence is paraphrased into a second word having a co-occurrence relation.

According to the present aspect, second sentences are generated with a first word making up the first sentence being paraphrased with a second word having a co-occurrence relation. Therefore, a variety of second sentences can be generated compared to when adopting an aspect in which second sentences simply having the same meaning as the first sentence are generated. As a result, although the similarity in the first language to the first sentence is low, second sentences with which translation results become hints for translating the first sentence can be generated.

(11) In the aforementioned aspect, the predetermined rule may be a third paraphrasing rule with which a first word included in a fragment making up the first sentence is paraphrased into a second word having an entailment relation.

According to the present aspect, second sentences are generated with a first word making up the first sentence being paraphrased with a second word having an entailment relation. Therefore, a variety of second sentences can be generated compared to when adopting an aspect in which second sentences simply having the same meaning as the first sentence are generated. As a result, although the similarity in the first language to the first sentence is low, second sentences with which translation results become hints for translating an input sentence can be generated.

(12) In the aforementioned aspect, the predetermined rule may be a fourth paraphrasing rule with which a first word included in a fragment making up the first sentence is paraphrased into a second word having a superordinate-subordinate relation.

According to the present aspect, second sentences are generated with a first word making up the first sentence being paraphrased with a second word having a superordinate-subordinate relation. Therefore, a variety of second sentences can be generated compared to when adopting an aspect in which second sentences simply having the same meaning content as the first sentence are generated. As a result, although the similarity in the first language to the first sentence is low, second sentences with which translation results or the like become hints for translating the first sentence can be generated.

(13) In the aforementioned aspect, the one or more fourth sentences may be presented with portions paraphrased from the first sentence being distinguished from other portions.

According to the present aspect, portions paraphrased from the first sentence can be easily recognized by the user.

Embodiments

FIG. 1 is a block diagram depicting a configuration of a translation support device 1 that is an example of a device according to an embodiment of the present disclosure. The translation support device 1 is a device that translates an input sentence written in a first language into a second language. A language such as Japanese, English, French, or German can be adopted as the first language, for example. A language that is different from the first language can be adopted as the second language. Japanese is adopted as the first language and English is adopted as the second language in the following description, but this is an example.

The translation support device 1 is provided with an input unit 2, an example match determining unit 3, an example corresponding translation database (DB) 4 (example of a database), a paraphrased sentence generation unit 5, an extraction unit 6, a machine translation unit 7, a reliability assigning unit 8, and an output unit 9 (example of a presentation unit). In FIG. 1, the translation support device 1 is constituted by a computer including a CPU, a ROM, and a RAM, for example. The input unit 2 is constituted by an input device such as a touch panel or input devices such as a keyboard and mouse, for example. The example match determining unit 3, the paraphrased sentence generation unit 5, the extraction unit 6, the machine translation unit 7, and the reliability assigning unit 8 may be realized by the CPU executing a program that causes the computer to function as the translation support device 1, or may be realized by means of a dedicated hardware circuit, for example. This program may be provided by being downloaded via a network, or may be provided recorded on a computer-readable non-transitory recording medium. Furthermore, the example corresponding translation DB 4 may be constituted by a storage device (memory). Furthermore, the output unit 9 may be constituted by a display device or a speaker.

It should be noted that the translation support device 1 may be constituted by a mobile information terminal such as a smartphone or a tablet terminal, or may be constituted by a stationary computer.

Figure 2:
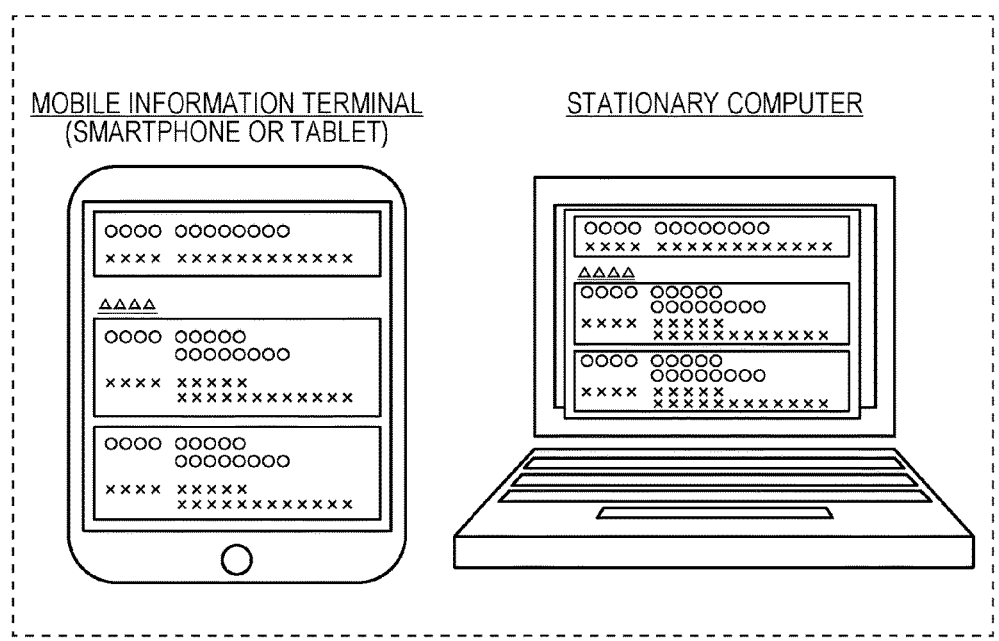
FIG. 2 is a drawing depicting an example of the translation support device when constituted by a mobile information terminal, and the translation support device when constituted by a stationary computer.

FIG. 2 is a drawing depicting an example of the translation support device 1 when constituted by a mobile information terminal, and the translation support device 1 when constituted by a stationary computer. In the left half of FIG. 2, the translation support device 1 is constituted by a mobile information terminal such as a smartphone or a tablet terminal. In the right half of FIG. 2, the translation support device 1 is constituted by a stationary computer. The constituent elements depicted in FIG. 1 for these cases are grouped within the mobile information terminal or the stationary computer.

Figure 3:
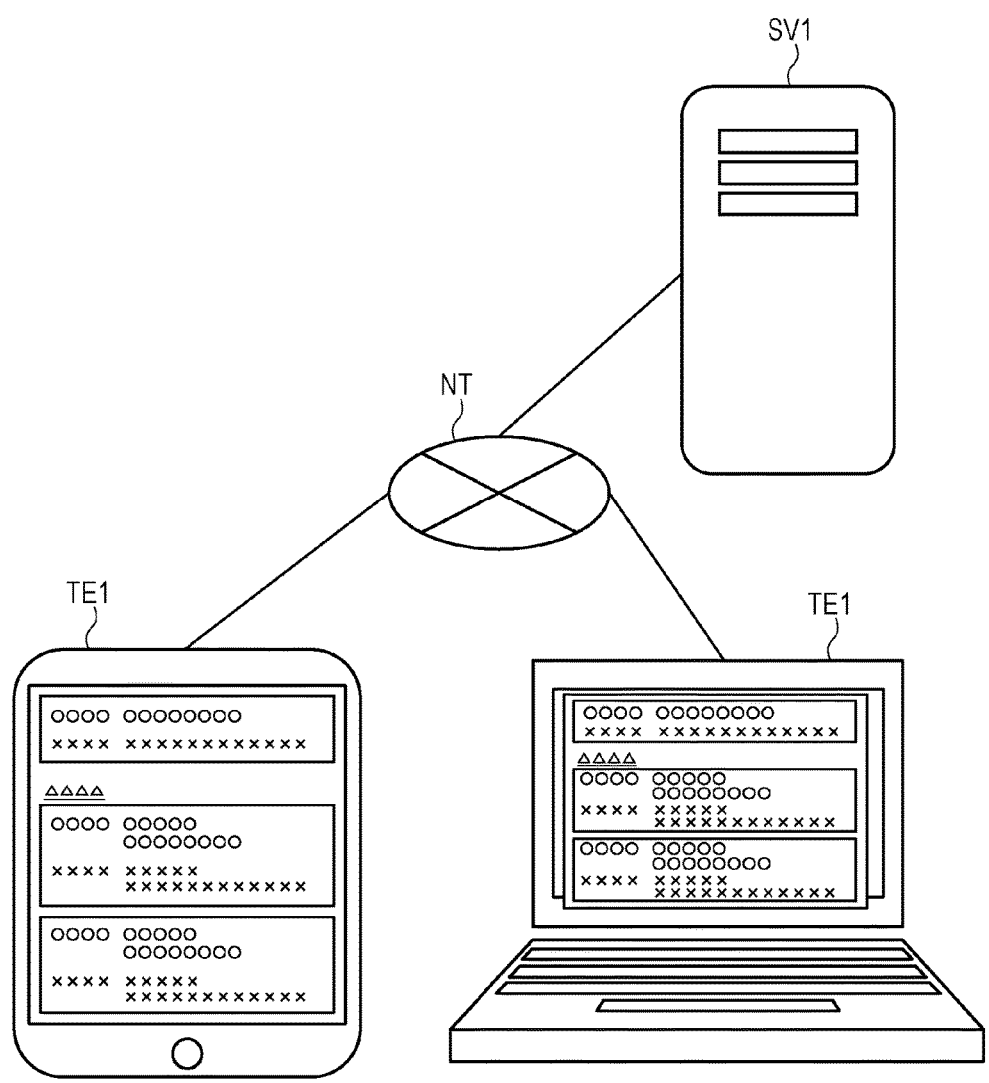
FIG. 3 is a drawing depicting an example of the translation support device when constituted by a cloud system.

Alternatively, the translation support device 1 may be constituted by a cloud system. FIG. 3 is a drawing depicting an example of the translation support device 1 when constituted by a cloud system. The cloud system is constituted by a server SV1 and one or more terminals TE1. The server SV1 and the terminals TE1 are communicably connected via a network NT such as the Internet. The server SV1 is a cloud server constituted by one or more computers. The terminals TE1 may be constituted by a mobile information terminal such as a smartphone or a tablet terminal, or may be constituted by a stationary computer.

In this case, the input unit 2 and the output unit 9 depicted in FIG. 1 are constituted by a terminal TE1 possessed by the user. Furthermore, the example match determining unit 3, the example corresponding translation DB 4, the paraphrased sentence generation unit 5, the extraction unit 6, the machine translation unit 7, and the reliability assigning unit 8 depicted in FIG. 1 are constituted by the server SV1. That is, a translation support function is mounted in the server SV1, and the terminal TE1 provides a user interface.

We will now once again refer to FIG. 1. The input unit 2 acquires an input sentence (example of a first sentence) written in a first language that is to be translated. The input sentence is a sentence that is input by the user, and is a sentence that is written in the first language.

The example match determining unit 3 determines whether or not an example sentence that matches the input sentence acquired by the input unit 2 is stored in the example corresponding translation DB 4. Then, if an example sentence that matches the input sentence is stored in the example corresponding translation DB 4, the example match determining unit 3 outputs the matching example sentence and an example corresponding translation that includes that example sentence to the output unit 9. Here, the example match determining unit 3 may determine that there is a match in the case where an example sentence and the input sentence completely match, for example. However, if the input sentence acquired by the input unit 2 is not stored in the example corresponding translation DB 4, the example match determining unit 3 outputs that input sentence to the paraphrased sentence generation unit 5 and the machine translation unit 7.

The example corresponding translation DB 4 is a database that stores one or more example corresponding translations having associated therein an example sentence written in the first language and an example corresponding translation in which the example sentence is written in the second language. The example corresponding translation DB 4 is an example of a database that includes a plurality of pairs of sentences written in the first language and translated sentences written in the second language. In detail, the example corresponding translation DB 4 is a database in which one record is allocated to one example corresponding translation, and is provided with an example sentence field and an example corresponding translation field, for example. An example sentence is stored in the example sentence field, and a translated sentence corresponding to the example sentence is stored in the example corresponding translation field. An example sentence is a sentence that has a record of having been used, and an example corresponding translation is a translated sentence for the example sentence that has a record of having been translated. The translation reliability for the example sentence and the example corresponding translation is 100%, for example.

In the case where the example match determining unit 3 has determined that the input sentence is not stored in the example corresponding translation DB 4, the paraphrased sentence generation unit 5 divides the input sentence acquired by the input unit 2 into a plurality of fragments, and paraphrases (replaces) one or more of the plurality of fragments into other phrasings in the first language using a predetermined paraphrasing rule (example of a predetermined rule), thereby generating a plurality of paraphrased input sentences (example of a plurality of second sentences).

Here, as a method for dividing the input sentence into a plurality of fragments, a method with which the input sentence is separated according to words is adopted, for example. However, the present embodiment is not restricted thereto, and a method with which the input sentence is separated according to parts of speech may be adopted, a method with which the input sentence is separated according to a predetermined number of characters (for example, two characters, three characters, or the like) may be adopted, a method with which the input sentence is separated according to phrases may be adopted, a method with which the input sentence is separated according to meaning classes may be adopted, or a method with which the input sentence is separated according to morphemes may be adopted.

Furthermore, the following first to fourth paraphrasing rules can be adopted as the paraphrasing rule.

The first paraphrasing rule is a rule with which a first word included in a fragment making up the input sentence is paraphrased with a second word having a similar context relation. Here, a similar context relation indicates a relation between words that are contextually similar, and the relations between words registered in the Database of Similar Context Terms of the ALAGIN language resources can be adopted, for example. For example, "Detective Conan", "Space Battleship Yamato", and the like correspond as words having a similar context relation with "Lupin the Third". Furthermore, "Brahms", "Schumann", "Mendelssohn" and the like correspond as words having a similar context relation with "Tchaikovsky". It should be noted that in the Database of Similar Context Terms of the ALAGIN language resources, "Lupin the Third" and "Lupin III" are determined as having a similar context relation; however, in the present embodiment, these are excessively close in terms of content, and may therefore be excluded from a similar context relation.

The second paraphrasing rule is a rule with which a first word included in a fragment making up the input sentence is paraphrased into a second word having a co-occurrence relation. Here, a co-occurrence relation indicates a relation between words having a high frequency of appearing in the same documents, and the relations between words registered in the Database of Word Co-occurrence of the ALAGIN language resources correspond, for example. For instance, "domestic travel", "discount airline ticket", "tour", "airline ticket", and "travel" correspond in descending order of DICE coefficients as words having a co-occurrence relation with "overseas travel". Furthermore, "New Year", "birthday", "Santa", "winter", and "end of year" correspond in descending order of DICE coefficients as words having a co-occurrence relation for "Christmas". It should be noted that the DICE coefficient is an index obtained by converting the similarity or co-occurrence between words into a numerical value.

The third paraphrasing rule is a rule with which a first word included in a fragment making up the input sentence is paraphrased into a second word having an entailment relation. Here, an entailment relation indicates a relation in which a first word entails a second word, and the relations between words registered in the Verb Entailment Database of the ALAGIN language resources correspond, for example. A first word entailing a second word means that if a situation represented by the first word is established, a situation represented by the second word is also established at the same time or prior thereto. For example, "to heat" corresponds with "to microwave", "to disintoxicate" corresponds with "to detoxify", "to loiter about" corresponds with "to wander around", "to die" corresponds with "apoptosis", "to go crazy" corresponds with "to break down", and "to drink" corresponds with "to be drunk". It should be noted that with an entailment relation, there are cases where a superordinate-subordinate relation is established; however, there are also cases such as with "to microwave" and "to heat" where a superordinate-subordinate relation is not established.

The fourth paraphrasing rule is a rule with which a first word included in a fragment making up the input sentence is paraphrased into a second word having a superordinate-subordinate relation. Here, a superordinate-subordinate relation indicates a relation between words registered in the Hypernym Hierarchy Database of the ALAGIN language resources, for example. In the case where a first word indicates a more common, more generic, or more abstract concept that includes a second word, the first word has a superordinate relation with respect to the second word.

Figure 4:
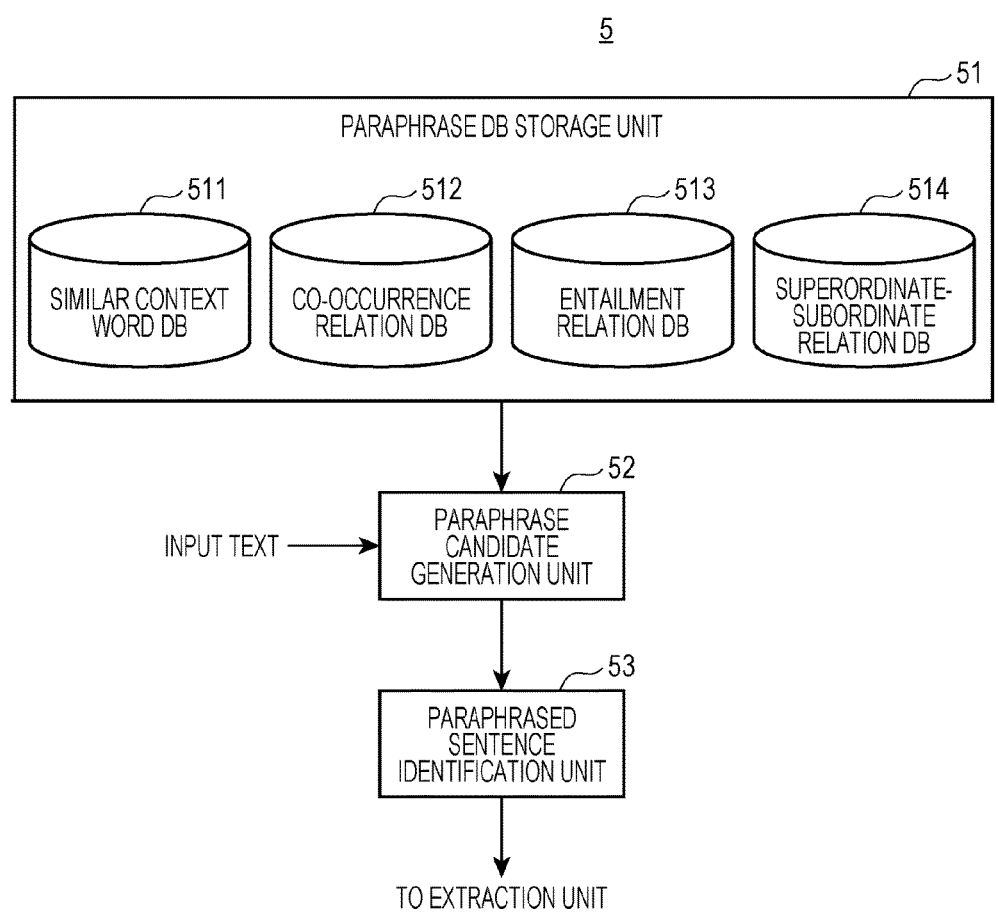
FIG. 4 is a block diagram depicting a detailed configuration of a paraphrased sentence generation unit.

FIG. 4 is a block diagram depicting a detailed configuration of the paraphrased sentence generation unit 5. The paraphrased sentence generation unit 5 is provided with a paraphrase database (DB) storage unit 51 that stores paraphrase DBs, a paraphrase candidate generation unit 52, and a paraphrased sentence identification unit 53. The paraphrase DBs are databases in which words in the first language and second words, which are obtained by expressing first words with another phrasing in the first language, are associated with each other.

In the present embodiment, the paraphrase DB storage unit 51 stores a similar context word DB 511, a co-occurrence relation DB 512, an entailment relation DB 513, and a superordinate-subordinate relation DB 514. Hereinafter, the similar context word DB 511, the co-occurrence relation DB 512, the entailment relation DB 513, and the superordinate-subordinate relation DB 514 are referred to as paraphrase DBs when not particularly distinguished from each other. The similar context word DB 511 is a database for paraphrasing the input sentence according to the first paraphrasing rule, and is a database in which words having a similar context relation are associated and stored in advance. Here, the Database of Similar Context Terms of the ALAGIN language resources can be adopted as the similar context word DB 511, for example.

The co-occurrence relation DB 512 is a database for paraphrasing the input sentence according to the second paraphrasing rule, and is a database in which words having a co-occurrence relation are associated and stored in advance. Here, the Database of Word Co-occurrence of the ALAGIN language resources can be adopted as the co-occurrence relation DB 512, for example.

The entailment relation DB 513 is a database for paraphrasing the input sentence according to the third paraphrasing rule, and is a database in which words having an entailment relation are associated and stored in advance. Here, the Verb Entailment Database of the ALAGIN language resources can be adopted as the entailment relation DB 513, for example.

The superordinate-subordinate relation DB 514 is a database for paraphrasing the input sentence according to the fourth paraphrasing rule, and is a database in which words having a superordinate-subordinate relation are associated and stored in advance. Here, the Hypernym Hierarchy Database of the ALAGIN language resources can be adopted as the superordinate-subordinate relation DB 514, for example.

The paraphrase candidate generation unit 52 paraphrases the input sentence according to each of the first to fourth paraphrasing rules by referring to the paraphrase DBs, and generates paraphrased input sentences. Here, for example, if it is assumed that input sentence B1 "kadoma made takushi ni shitai" (I want to take a taxi to Kadoma) has been input, the paraphrase candidate generation unit 52 divides the input sentence B1 by word units as in "kadoma/made/takushi/ni/shitai". Then, the paraphrase candidate generation unit 52 paraphrases the input sentence according to each of the first to fourth paraphrasing rules by referring to each of the similar context word DB 511, the co-occurrence relation DB 512, the entailment relation DB 513, and the superordinate-subordinate relation DB 514, and generates at least four paraphrased input sentences.

Here, the paraphrase candidate generation unit 52, when generating a paraphrased input sentence using an $i^{th}$ (i=1 to 4) paraphrasing rule from among the first to fourth paraphrasing rules, may generate one paraphrased input sentence by paraphrasing one word, or may generate one paraphrased input sentence by paraphrasing words in a plurality of portions. Furthermore, the paraphrase candidate generation unit 52, when paraphrasing the input sentence using an $i^{th}$ paraphrasing rule, may generate a plurality of paraphrased input sentences having a different number of paraphrased words.

For example, the paraphrase candidate generation unit 52 may randomly specify one word from the divided input sentence, and may paraphrase that one word with another paraphrasable word registered in the paraphrase DBs if the same word as the one specified word is registered in the paraphrase DBs. However, if the same word as the one specified word is not registered in the paraphrase DBs, the paraphrase candidate generation unit 52 may randomly specify another one word other than the aforementioned one word, and may paraphrase that other one word with another paraphrasable word registered in the paraphrase DBs if the same word as the other one specified word is registered in the paraphrase DBs. The paraphrase candidate generation unit 52 may repeat this kind of processing to generate one or more paraphrased input sentences that are paraphrased according to an $i^{th}$ paraphrasing rule.

For example, if it is assumed that "basu" (bus) and "toraku" (truck) are registered as words having a similar context relation with "takushi" (taxi) in the similar context word DB 511, one word may be randomly determined from among "basu" and "toraku", and "takushi" may be paraphrased with that one word, or "takushi" may be paraphrased with the word that is the most similar to "takushi".

It should be noted that the paraphrase candidate generation unit 52 may add additional data indicating the paraphrased portion in a generated paraphrased input sentence and output such to the paraphrased sentence identification unit 53.

The paraphrased sentence identification unit 53 extracts plausible sentences from among the paraphrased input sentences, and outputs such to the extraction unit 6. Here, the paraphrased sentence identification unit 53 calculates the appearance probability of the paraphrased input sentences using an N-gram language model, for example, and outputs paraphrased input sentences having a calculated appearance probability that is equal to or greater than a reference value to the extraction unit 6. An N-gram language model is a stochastic language model in which "plausibility", which indicates probable use by a person, is modeled as a probability. For example, in the case where there is a sentence B2 "kyo no yushoku ha kare desu" (Today's evening meal is curry) and a sentence B3 "kyo no yushoku ha yakyu desu" (Today's evening meal is baseball), it can be said that the sentence B2 is more plausible than the sentence B3. In this case, the appearance probability of the sentence B2 is higher than the appearance probability of the sentence B3 in an N-gram language model. Here, an empirically obtained value with which it is determined that a sentence is unnatural if the appearance probability decreases any further can be adopted as the reference value. It should be noted that the paraphrased sentence identification unit 53 also includes additional data indicating the paraphrased portion in a paraphrased input sentence to be output, and outputs such to the extraction unit 6.

We will now once again refer to FIG. 1. The extraction unit 6 calculates respective overall evaluation values (example of a degree of coincidence) indicating the relevance between the paraphrased input sentences output from the paraphrased sentence generation unit 5 and example sentences stored in the example corresponding translation DB 4, and extracts one or more example sentences (example of a third sentence) from the example corresponding translation DB 4 on the basis of the calculated overall evaluation values. Furthermore, the extraction unit 6 extracts one or more paraphrased input sentences that are similar to the extracted example sentences, from the paraphrased input sentences output from the paraphrased sentence generation unit 5. Hereinafter, the paraphrased input sentences that are extracted are referred to as "extracted paraphrased sentences" (example of one or more second sentences). It should be noted that relevance indicates that a paraphrased input sentence and an example sentence have a certain syntactic relation.

Here, the extraction unit 6 calculates the overall evaluation value between each paraphrased input sentence and each example sentence using the following indexes A1 to A4.

Figure 5:
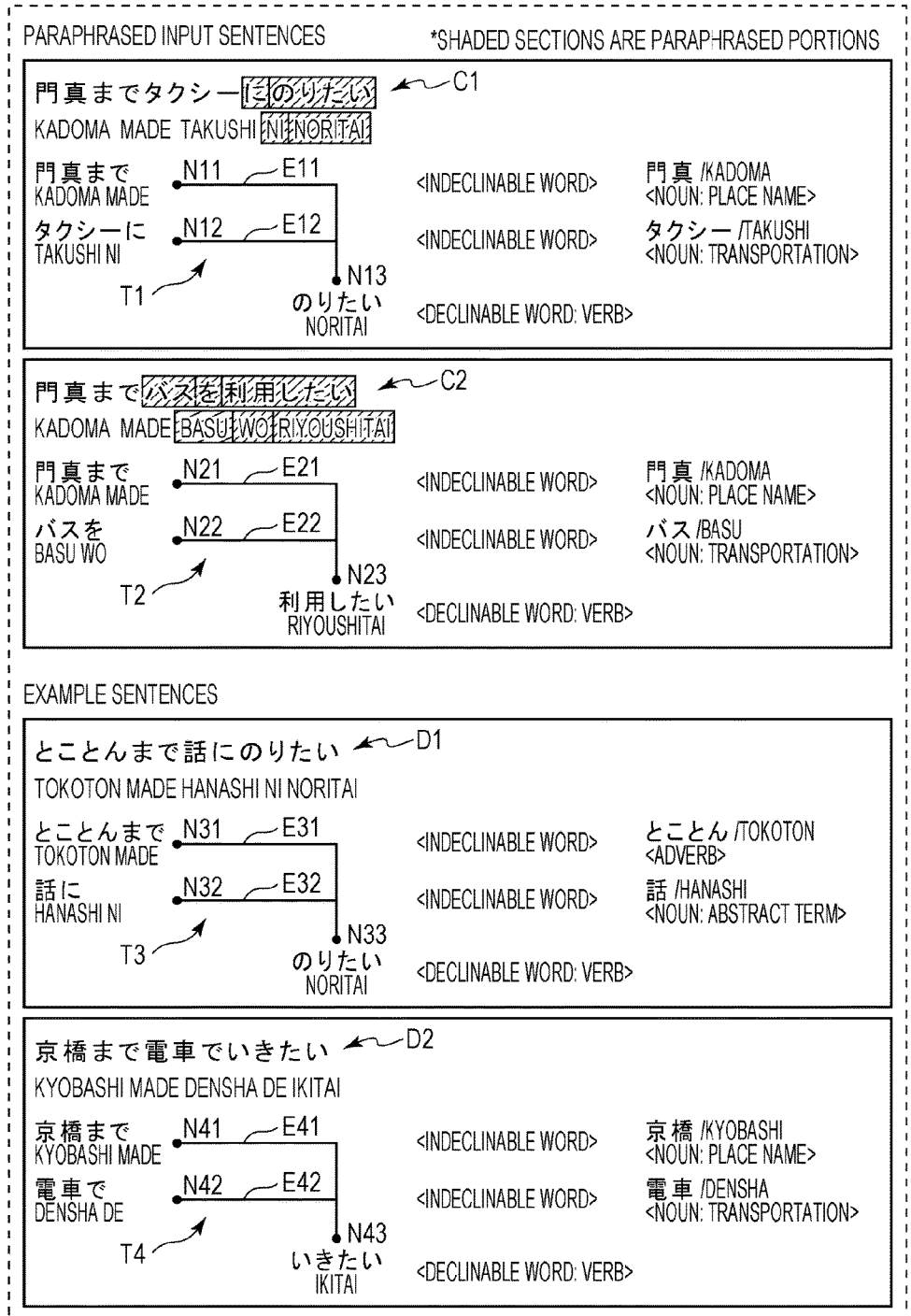
FIG. 5 is a drawing depicting examples of paraphrased input sentences and example sentences.

The index A1 (example of a third index) is an index that indicates similarity in sentence structure between each paraphrased input sentence and each example sentence. FIG. 5 is a drawing depicting examples of paraphrased input sentences and example sentences.

Referring to FIG. 5, for example, it is assumed that the input sentence B1 "kadoma made takushi ni shitai" (I want to take a taxi to Kadoma) serves as the paraphrased input sentence, and paraphrased input sentence C1 "kadoma made takushi ni noritai" (I want to take a taxi to Kadoma) and paraphrased input sentence C2 "kadoma made basu o ryoshitai" (I want to take the bus to Kadoma) are generated by the paraphrased sentence generation unit 5.

Furthermore, it is assumed that example sentence D1 "tokoton made hanashi ni noritai" (I want to go along with the discussion until the very end) and example sentence D2 "kyobashi made densha de ikitai" (I want to go by train to Kyobashi) are stored in the example corresponding translation DB 4.

First, the extraction unit 6 separates the paraphrased input sentences C1 and C2 into clauses or words, analyzes the sentence structures of the paraphrased input sentences C1 and C2, and generates syntax trees. Here, in the example of the paraphrased input sentence C1, the clause "kadoma made" and the clause "takushi ni" both relate to the clause "noritai". Therefore, a tree structure T1 is generated including two edges E11 and E12 in which a node N11 corresponding to the clause "kadoma made" and a node N12 corresponding to the clause "takushi ni" are each connected to a node N13 corresponding to the clause "noritai".

The generation of this kind of tree structure can be realized using "KNP", which is a syntax analysis tool, for example. Furthermore, analysis of the parts of speech of words making up the sentences can be realized using "juman", which is a morpheme analysis tool, for example. Consequently, the extraction unit 6 may use "KNP" and "juman" to generate tree structures for sentences and extract the parts of speech of the words making up the sentences.

In the example of the paraphrased input sentence C2, the clause "kadoma made" and the clause "basu o" both relate to the clause "ryoshitai". Therefore, a tree structure T2 is generated including two edges E21 and E22 in which a node N21 corresponding to the clause "kadoma made" and a node N22 corresponding to the clause "basu o" are each connected to a node N23 corresponding to the clause "ryoshitai".

In the example of the example sentence D1, the clause "tokoton made" and the clause "hanashi ni" relate to the clause "noritai". Therefore, a tree structure T3 is generated including two edges E31 and E32 in which a node N31 corresponding to the clause "tokoton made" and a node N32 corresponding to the clause "takushi" are each connected to a node N33 corresponding to the clause "noritai".

In the example of the example sentence D2, the clause "kyobashi made" and the clause "densha de" relate to the clause "ikitai". Therefore, a tree structure T4 is generated including two edges E41 and E42 in which a node N41 corresponding to the clause "kyobashi made" and a node N42 corresponding to the clause "densha de" are each connected to a node N43 corresponding to the clause "ikitai".

In this way, the extraction unit 6 analyzes the tree structures of the paraphrased input sentences and the example sentences. Then, the extraction unit 6 may calculate the degree of similarity between the tree structures of the paraphrased input sentences and the example sentences as the index A1 using a tree matching method, for example. It should be noted that the tree structures of the example sentences may be stored in the example corresponding translation DB 4 in advance. In the present embodiment, the index A1 takes a numerical value of 0 to 100%, and the value increases as the degree to which tree structures match increases.

In the example of FIG. 5, the tree structures T1 to T4 for the paraphrased input sentences C1 and C2 and the example sentences D1 and D2 all have the same structure. Consequently, indexes A1 for the paraphrased input sentence C1 with respect to the example sentences D1 and D2 are respectively calculated as 100% by the extraction unit 6. Furthermore, indexes A1 for the paraphrased input sentence C2 with respect to the example sentences D1 and D2 are also respectively calculated as 100% by the extraction unit 6.

It should be noted that the descriptions of <indeclinable word>, <declinable word: verb>, and the like in brackets in FIG. 5 have been added for convenience in order to describe the parts of speech and the like of the corresponding clauses, and are not actually used when calculating the index A1.

The index A2 (example of a fourth index) is an index that indicates a value that increases as the number of matching parts of speech between each paraphrased input sentence and each example sentence increases.

In the present embodiment, the extraction unit 6 calculates the index A2 according to the number of matching parts of speech between clauses located in the same portions in a paraphrased input sentence and an example sentence having a matching sentence structure (in a paraphrased input sentence and an example sentence for which the index A1 is 100%).

In the example of FIG. 5, the extraction unit 6 calculates the index A2 in such a way that, in a paraphrased input sentence and an example sentence having a matching sentence structure, the value increases the more that the parts of speech of clauses located in the same portions match as nouns. Hereinafter, the "clauses located in the same portions" are referred to as "corresponding clauses". Furthermore, a "noun clause" means a "clause that includes a noun". For example, the clause "kadoma made" is made up of the word "kadoma" and the word "made", and since the word "kadoma" is a noun, "kadoma made" is a noun clause.

In detail, the index A2 is defined according to expression (1) below.

$$\text{Index } A2 = (1 - \alpha/\beta) \times 100(\%) \quad (1)$$

α: number of corresponding clauses that are not nouns
β: total number of noun clauses in a paraphrased input sentence In the paraphrased input sentence C1 depicted in FIG. 5, there are two noun clauses of "kadoma made" and "takushi ni". Furthermore, the clause "tokoton made" of the example sentence D1 corresponding to the clause "kadoma made" of the paraphrased input sentence C1 is an adverb, and the clause "hanashi ni" of the example sentence D1 corresponding to the clause "takushi ni" of the paraphrased input sentence C1 is a noun. Consequently, in the paraphrased input sentence C1 and the example sentence D1, β=2, α=1, and the index A2 is 50%.

Furthermore, the clause "kyobashi made" of the example sentence D2 corresponding to the clause "kadoma made" of the paraphrased input sentence C1 is a noun, and the clause "densha de" of the example sentence D2 corresponding to the clause "takushi ni" of the paraphrased input sentence C1 is a noun. Consequently, in the paraphrased input sentence C1 and the example sentence D2, β=2, α=0, and the index A2 is 100%. Similarly, the indexes A2 for the paraphrased input sentence C2 and the example sentences D1 and D2 are respectively 50% and 100%.

It should be noted that α of expression (1) may be the number of different categories of corresponding clauses. Here, a category indicates the type to which a noun word belongs such as place names, transportation, and abstract terms, for example. In FIG. 5, "kadoma" and "kyobashi" come under place names, "takushi" and "basu" come under transportation, and "hanashi" comes under abstract terms.

When this aspect is adopted, for example, the clause "takushi" of the paraphrased input sentence C1 and the clause "hanashi ni" of the example sentence D1 are both noun clauses; however, the category of the former is "transportation" and the category of the latter is "abstract term", and therefore α is incremented by 1, and the index A2 decreases compared to when adopting an aspect in which the categories are not taken into consideration.

Here, the extraction unit 6 calculated the index A2 with respect to a paraphrased input sentence and an example sentence having a matching sentence structure; however, the present disclosure is not restricted thereto, and the index A2 may be calculated without taking into consideration whether or not there is a matching sentence structure, in other words, independently from the index A1. Furthermore, the index A2 is calculated based on the number of matching noun clauses, yet the index A2 may be calculated based on the number of matching parts of speech.

For example, it is assumed that there has been a paraphrased input sentence C1X made up of "clause C11/clause C12/clause C13/clause C14". Furthermore, it is assumed that there has been an example sentence D1X made up of "clause D11/clause D12/clause D13". It should be noted that "/" indicates a break between clauses. In this case, the extraction unit 6 may extract, as corresponding clauses, clauses located in the same positions counting from the start in the paraphrased input sentence C1X and the example sentence D1X, and may calculate the index A2 on the basis of the number of matching parts of speech between the extracted clauses.

For example, the extraction unit 6 extracts the three pairs of clauses of "clause C11" and "clause D11", "clause C12" and "clause D12", and "clause C13" and "clause D13" as corresponding clauses. It should be noted that "clause C14" has no corresponding clause in the example sentence D1X, and is therefore excluded from the extraction targets. Then, the extraction unit 6 may calculate the index A2 using expression (1) with the total number of pairs of clauses in which the parts of speech do not match serving as α and the number of clauses extracted from the paraphrased input sentence C1X serving as β.

The index A3 (example of a second index) is an index that indicates a value that increases as the degree of textual similarity decreases between the input sentence and an example sentence having a matching sentence structure with a paraphrased input sentence.

In detail, the index A3 is defined according to expression (2) below.

$$\text{Index } A3 = 100 - \text{degree of textual similarity between input sentence and example sentence} \quad (2)$$

First, the extraction unit 6 extracts example sentences having a matching sentence structure with a paraphrased input sentence from the example corresponding translation DB 4. Then, the extraction unit 6 calculates the degrees of textual similarity between the extracted example sentences and the input sentence, and calculates the index A3 for each example sentence in such a way that the value increases as the calculated degree of textual similarity decreases.

A matching sentence structure means that the tree structure matches as mentioned above, in other words, that the index A1 is 100%. The degree of textual similarity indicates the degree to which the content of sentences such as the phrasing and appearance of the sentences matches, and, for example, is calculated using the similar text function of the PHP language with which the similarity between two character strings is calculated.

For example, it is assumed that the paraphrased input sentence C1 "kadoma made takushi ni noritai" (I want to take a taxi to Kadoma) is generated as a paraphrased input sentence for input sentence B1 "kadoma made takushi ni shitai" (I want to take a taxi to Kadoma). In this case, the extraction unit 6 extracts example sentences having a matching sentence structure with the paraphrased input sentence C1 from the example corresponding translation DB 4. Here, it is assumed that the four example sentences of the example sentence D2 "kyobashi made densha de ikitai" (I want to go by train to Kyobashi), the example sentence D3 "moriguchi made kuruma o ryoshitai" (I want to take a car to Moriguchi), the example sentence D4 "tokyo made shinkansen de iku" (I will go by bullet train to Tokyo), and the example sentence D5 "tokoton made hanashi ni noritai" (I want to go along with the discussion until the very end) are extracted.

In this case, the extraction unit 6 calculates the respective indexes A3 between the input sentence B1 and the four example sentences D2 to D5 using expression (2).

In the above description, when calculating the index A3, the extraction unit 6 extracted an example sentence having a matching sentence structure with a paraphrased input sentence; however, the present disclosure is not restricted thereto, and an example sentence having a similar sentence structure to a paraphrased input sentence may be extracted. Here, the sentence structure being similar corresponds to the case where the index A1 is equal to or greater than a reference value. As the reference value, a value that is equal to or greater than at least 50%, such as 50%, 60%, 70%, 80%, or 90%, can be adopted.

The index A4 (example of a first index) is an index that indicates the degree of textual similarity between a paraphrased input sentence and an example sentence. The degree of textual similarity is the same as the degree of textual similarity used when calculating the index A3.

In the present embodiment, the extraction unit 6 extracts example sentences having a matching sentence structure with a paraphrased input sentence, in other words, example sentences for which the index A1 is 100%, from the example corresponding translation DB 4, and calculates the respective degrees of textual similarity between the extracted example sentences and the paraphrased input sentence as the index A4.

For example, if it is assumed that the aforementioned paraphrased input sentence C1 "kadoma made takushi ni noritai" (I want to take a taxi to Kadoma) has been generated, the extraction unit 6 extracts example sentences having a matching sentence structure with the paraphrased input sentence C1 from the example corresponding translation DB 4. Here, it is assumed that the four example sentences D2 to D5 described for the index A3 have been extracted. In this case, the extraction unit 6 may calculate the respective degrees of textual similarity between the paraphrased input sentence C1 and the example sentences D2 to D5 as the index A4.

It should be noted that the extraction unit 6 may calculate the value of the index A4 in such a way that said value increases as the number of paraphrased portions in a paraphrased input sentence increases. For example, the extraction unit 6 may calculate a final index A4 by multiplying the degree of textual similarity by a paraphrasing rate. The proportion of the number of paraphrased characters out of the total number of characters in a paraphrased input sentence can be adopted as the paraphrasing rate, for example.

Then, the extraction unit 6 calculates the product, for example, of the indexes A1 to A4 of each example sentence as the overall evaluation value of each example sentence. Then, the extraction unit 6 extracts n (an integer equal to or greater than 1) number of example sentences in descending order of the overall evaluation value.

It should be noted that the extraction unit 6 may extract example sentences having an overall evaluation value that is greater than a reference value (example of a threshold value) from among the example sentences. Alternatively, the extraction unit 6 may extract example sentences having an overall evaluation value that is greater than the reference value from among the example sentences, and may extract n number of example sentences in descending order of the overall evaluation value if there are n or more number of extracted example sentences.

Then, the extraction unit 6 extracts example corresponding translations for the n number of example sentences extracted, from the example corresponding translation DB 4, and outputs such to the output unit 9.

When the processing for extracting example sentences has finished, the extraction unit 6 carries out processing for extracting n number of extracted paraphrased sentences that are similar to the n number of example sentences extracted. Here, the extraction unit 6 extracts n number of extracted paraphrased sentences by extracting paraphrased input sentences having the largest index A4 with respect to each of the n number of example sentences extracted.

For example, if it is assumed that the four paraphrased input sentences C1 to C4 have been output from the paraphrased sentence generation unit 5 and the two example sentences D1 and D2 have been extracted from the overall evaluation values, the extraction unit 6 calculates the respective indexes A4 for the paraphrased input sentences C1 to C4 with respect to each of the example sentences D1 and D2. Then, the extraction unit 6 extracts the paraphrased input sentences having the largest index A4 for each of the example sentences D1 and D2, as extracted paraphrased sentences.

In the above description, the extraction unit 6 calculated the overall evaluation value using all of the indexes A1 to A4; however, the present disclosure is not restricted thereto, and the extraction unit 6 may calculate the overall evaluation value using at least one of the indexes A1 to A4. Furthermore, the extraction unit 6 adopted the product of the indexes A1 to A4 as the overall evaluation value; however, the present disclosure is not restricted thereto, and the extraction unit 6 may adopt the average value or the weighted average value of the indexes A1 to A4 as the overall evaluation value.

The machine translation unit 7 generates n number of translated paraphrased sentences (example of fifth sentences) by machine-translating each of the n number of extracted paraphrased sentences output from the extraction unit 6 into the second language. Here, the machine translation unit 7 carries out machine translation by using any kind of translation engine. For example, the machine translation unit 7 may use a translation engine provided on a website, or may use translation application software provided in the translation support device 1 itself. Furthermore, the machine translation unit 7 machine-translates the input sentence that is output from the example match determining unit 3, and generates a translated input sentence.

The reliability assigning unit 8 calculates the translation reliability of the n number of translated paraphrased sentences generated by the machine translation unit 7. Here, the reliability assigning unit 8 may calculate the translation reliability from the degree of coincidence with a corresponding extracted paraphrased sentence obtained when a translated paraphrased sentence is back-translated from the second language to the first language. Furthermore, the reliability assigning unit 8 calculates the translation reliability also for the translated input sentence.

The output unit 9 displays the n number of example corresponding translations (example of fourth sentences) extracted by the extraction unit 6. Furthermore, the output unit 9 displays the n number of translated paraphrased sentences generated by the machine translation unit 7 and the n number of paraphrased input sentences corresponding thereto, together with the translation reliability. Additionally, the output unit 9 displays the input sentence and the translated input sentence together with the translation reliability.

It should be noted that in the case where the example match determining unit 3 has determined that the input sentence matches any of the example sentences stored in the example corresponding translation DB 4, the output unit 9 may display the example corresponding translations output from the example match determining unit 3.

Figure 7:
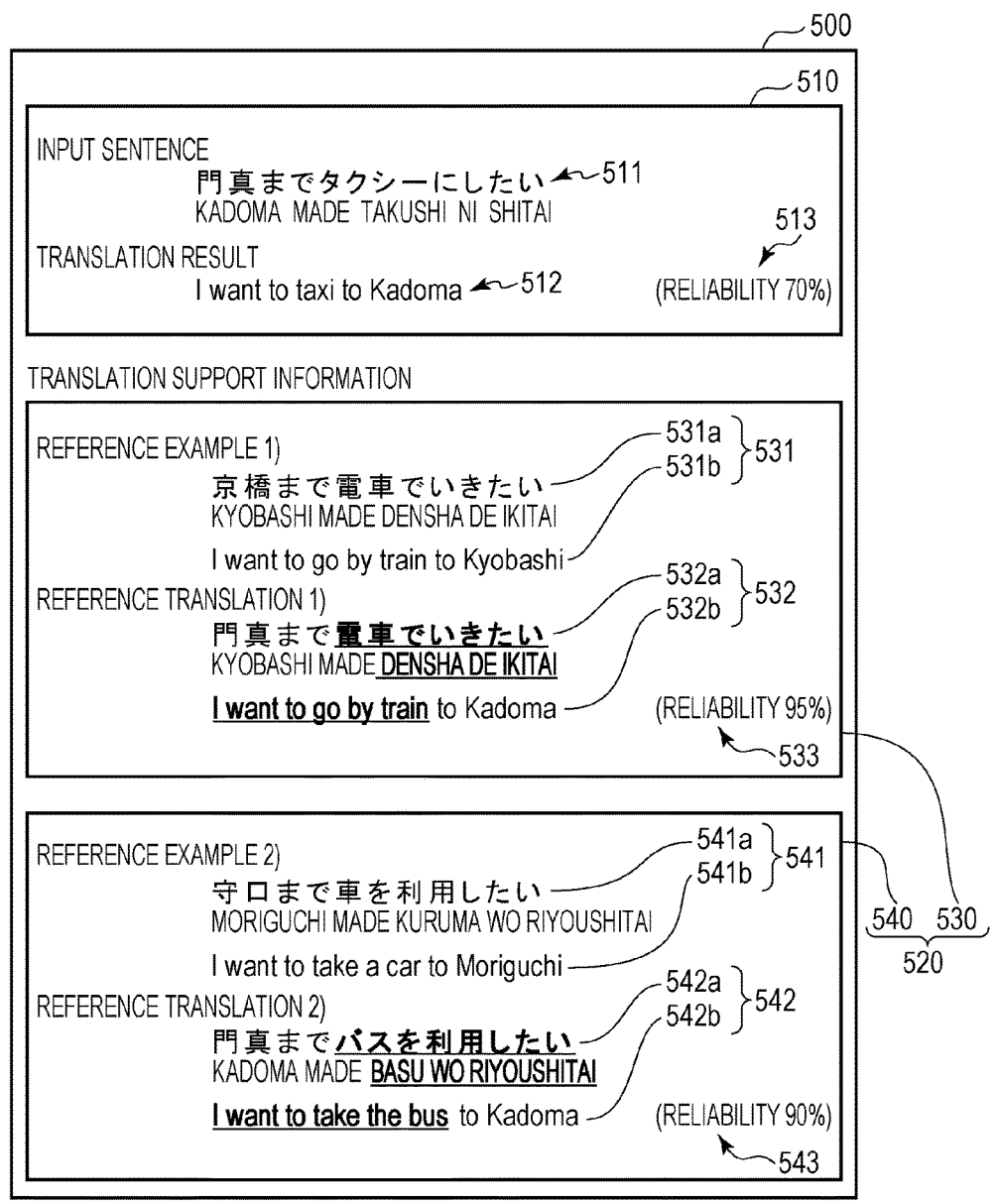
FIG. 7 is a drawing depicting an example of an output image displayed by an output unit.

FIG. 7 is a drawing depicting an example of an output image 500 displayed by the output unit 9. The output image 500 includes an input sentence display field 510 and translation support information display fields 520. The input sentence display field 510 displays input sentence 511 "kadoma made takushi ni shitai" and translated input sentence 512 "I want to taxi to Kadoma", which is a machine translation result for the input sentence 511, side-by-side. Furthermore, the input sentence display field 510 also displays a reliability display field 513 that displays the translation reliability of the translated input sentence 512. Here, the degree of coincidence between a back-translation result of the translated input sentence 512 and the input sentence 511 was 70%, and therefore "70%" is displayed in the reliability display field 513.

The translation support information display fields 520 display example sentences and the like relating to the input sentence 511. Here, two example sentences have been extracted by the extraction unit 6 as example sentences for the input sentence 511, and therefore two translation support information display fields 530 and 540 corresponding to two example sentences 531*a* and 541*a* are displayed. Furthermore, the overall evaluation value for the example sentence 531*a* was higher than that of the example sentence 541*a*, and therefore the translation support information display field 530 corresponding to the example sentence 531*a* is displayed above the translation support information display field 540 corresponding to the example sentence 541*a*.

The translation support information display field 530 includes a reference example display field 531 having the heading "reference example 1", and a reference translation display field 532 having the heading "reference translation 1".

The reference example display field 531 displays the example sentence 531*a* "kyobashi made densha de ikitai" having the highest overall evaluation value, and an example corresponding translation 531*b* "I want to go by train to Kyobashi" corresponding thereto, side-by-side.

The reference translation display field 532 displays an extracted paraphrased sentence 532*a* "kadoma made densha de ikitai" having the highest degree of textual similarity (index A4) with respect to the example sentence 531*a*, and a translated paraphrased sentence 532*b* "I want to go by train to Kadoma" corresponding thereto, side-by-side.

Furthermore, the translation support information display field 530 displays a reliability display field 533 that indicates the translation reliability of the translated paraphrased sentence 532*b*. Here, the degree of coincidence between the back-translation result for the translated paraphrased sentence 532*b* and the extracted paraphrased sentence 532*a* was 95%, and therefore "95%" is displayed.

Furthermore, in the extracted paraphrased sentence 532*a*, the "densha de ikitai" portion is underlined, and thus the portion paraphrased from the input sentence 511 is displayed in such a way as to be distinguishable from other portions. Furthermore, in the translated paraphrased sentence 532*b* also, the "I want to go by train" portion is underlined, and thus the translation result for the paraphrased portion is displayed in such a way as to be distinguishable from the translation results for other portions.

The user is thereby able to visually recognize portions paraphrased from the input sentence 511 in the extracted paraphrased sentence 532*a* and the translated paraphrased sentence 532*b*.

The translation support information display field 540 also displays a reference example display field 541 and a reference translation display field 542, similar to the translation support information display field 530.

The reference example display field 541 displays the example sentence 541*a* "moriguchi made kuruma o ryoshitai" having the second highest overall evaluation value, and a reference translation 541*b* "I want to take a car to Moriguchi" corresponding thereto.

The reference translation display field 542 displays an extracted paraphrased sentence 542*a* "kadoma made basu o ryoshitai" having the highest degree of textual similarity (index A4) with respect to the example sentence 541*a*, and a translated paraphrased sentence 542*b* "I want to take the bus to Kadoma" corresponding thereto, side-by-side.

The portion paraphrased from the input sentence 511 is "basu o ryoshitai" in the extracted paraphrased sentence 542*a*, and that portion is therefore underlined. Furthermore, the translated portion "I want to take the bus" corresponding to the paraphrased portion is underlined in the translated paraphrased sentence 542*b*. Additionally, the degree of coincidence between the back-translation result for the translated paraphrased sentence 542*b* and the extracted paraphrased sentence was 90%, and therefore "90%" is displayed in the reliability display field.

In this way, the translation support information display fields 520 that include example sentences having higher overall evaluation values are displayed higher up in the output image 500, and the user is therefore able to visually recognize translation support information that includes an example corresponding translation, a translated paraphrased sentence, or the like having a high degree or importance.

It should be noted that two translation support information display fields 520 are displayed in the example of FIG. 7; however, this is an example, and if three or more example sentences have been extracted by the extraction unit 6, the output image 500 may display translation support information display fields 520 including the three or more example sentences. In this case also, the translation support information display fields 520 may be displayed in such a way that example sentences having higher overall evaluation values are positioned higher up.

Furthermore, in the example of FIG. 7, paraphrased portions (character strings) are displayed in a highlighted manner using underlining; however, the present disclosure is not restricted thereto, and an aspect may be adopted in which a highlighted display is implemented with a marker being added in the background of the paraphrased portions, an aspect may be adopted in which a highlighted display is implemented with the color of the characters of the paraphrased portions being different from the colors of the characters of non-paraphrased portions, an aspect may be adopted in which a highlighted display is implemented with the paraphrased portions in boldface, or an aspect may be adopted in which these aspects are combined. Additionally, in the present disclosure, non-paraphrased portions may be displayed in a highlighted manner with paraphrased portions not being displayed in a highlighted manner.

Furthermore, in the example of FIG. 7, a highlighted display is not particularly implemented for example sentences and example corresponding translations; however, the present disclosure is not restricted thereto, and portions (character strings) of example sentences and example corresponding translations corresponding to extracted paraphrased sentences may be displayed in a highlighted manner.

Next, a specific example of the processing performed by the extraction unit 6 in the translation support device 1 will be described. Here, it is assumed that input sentence (I) "kadoma made takushi ni shitai" (I want to take a taxi to Kadoma) has been input, and it is assumed that the following three paraphrased input sentences have been generated by the paraphrased sentence generation unit 5. In this example, it is assumed that (A) to (C) all have the same sentence structure, in other words, the same tree structure.
(A) "kadoma made densha de ikitai" (I want to go by train to Kadoma)
(B) "kadoma made basu o ryoshitai" (I want to take the bus to Kadoma)
(C) "kadoma made takushi ni noritai" (I want to take a taxi to Kadoma)

Furthermore, it is assumed that the following four example sentences (1) to (4) for which the index A1 is 100%, in other words, which have the same sentence structure with respect to the aforementioned paraphrased input sentences (A) to (C), are extracted from the example corresponding translation DB 4. It should be noted that in this specific example, it is assumed that the extraction unit 6 extracts example sentences having the same sentence structure as the paraphrased input sentences from the example corresponding translation DB 4, and calculates the indexes A2 to A4 for the extracted example sentences.
(1) "kyobashi made densha de ikitai" (I want to go by train to Kyobashi)
(2) "moriguchi made kuruma o ryoshitai" (I want to take a car to Moriguchi)
(3) "tokyo made shinkansen de iku" (I will go by bullet train to Tokyo)
(4) "tokoton made hanashi ni noritai" (I want to go along with the discussion until the very end)

Next, the extraction unit 6 calculates the index A2 using the aforementioned expression (1) for each of the example sentences (1) to (4). In this specific example, since the paraphrased input sentences (A) to (C) have the same sentence structure, the paraphrased input sentence (A) is used as a representative, and the index A2 between the input sentences (1) to (4) and the paraphrased input sentence (A) is calculated.

The total number of noun clauses in the paraphrased input sentence (A) is 2 with "kyobashi made" and "densha de", and therefore β=2.

Furthermore, in the example sentences (1) to (3), with respect to the paraphrased input sentence (A), the number of corresponding clauses that are not nouns is 0, and therefore α=0 and the index A2 is 100%. However, in the example sentence (4), the clause "hanashi ni" corresponding to the noun clause "densha de" of the paraphrased input sentence (A) is a noun, yet the clause "tokoton made" corresponding to the noun clause "kadoma made" of the paraphrased input sentence (A) is not a noun. Therefore, in example sentence (4), with respect to the paraphrased input sentence (A), the number of corresponding clauses that are not nouns is 1. Thus, in the example sentence (4), α=1 and the index A2=(1½)×100=50%. Consequently, as indicated in table H1 in FIG. 6, the indexes A2 for example sentences (1) to (4) are respectively 100%, 100%, 100%, and 50%. FIG. 6 is a table H1 in which specific examples in the present embodiment have been gathered. In table H1, the indexes A1 to A4 for example sentences (1) to (4) have been calculated.

Next, the extraction unit 6 uses the aforementioned expression (2) to calculate the respective indexes A3 between the example sentences (1) to (4) and the input sentence (I). Here, as indicated in table H1, the indexes A3 for the example sentences (1) to (4) are respectively calculated as "36.8%", "41.1%", "61.8%", and "55.8%". It is thereby understood that, from among the example sentences (1) to (4), the example sentence (3) "tokyo made shinkansen de iku" (I will go by bullet train to Tokyo) has the lowest degree of textual similarity with respect to the input sentence (I) "kadoma made takushi ni shitai" (I want to take a taxi to Kadoma), in other words, is the furthest away in terms of meaning content.

It should be noted that in this specific example, the indexes A3 for the paraphrased input sentences (B) and (C) are the same as the index A3 for the paraphrased input sentence (A). The reason therefor is that the example sentences (1) to (4) are used also when calculating the index A3 for the paraphrased input sentences (B) and (C).

In this way, by extracting example sentences having a large index A3, it is possible to extract example sentences having a similar sentence structure to the input sentence but different meaning content. As a result, a variety of example corresponding translations can be presented to the user.

Next, the extraction unit 6 calculates the respective indexes A4 between the paraphrased input sentences (A) to (C) and the example sentences (1) to (4). In this specific example, 3×4=12 indexes A4 are calculated, and the values thereof are as indicated in the table H1.

Next, the extraction unit 6 calculates the overall evaluation values (%) for the example sentences (1) to (4) according to index A1×index A2×index A3×index A4. In this specific example, high (large) overall evaluation values are obtained in the order of example sentences (1) to (4). It should be noted that in this specific example, since the example sentences (1) to (4) have the same sentence structure as the paraphrased input sentences (A) to (C), the indexes A1 for the example sentences (1) to (4) are all 100%.

Next, the extraction unit 6 extracts the top n number of example sentences in descending order of the overall evaluation value, and extracts n number of example corresponding translations that include the extracted n number of example sentences, from the example corresponding translation DB 4. For example, if n=2, the extraction unit 6 extracts two example corresponding translations that include the example sentences (1) and (2).

Next, the extraction unit 6 extracts, for the extracted example sentences, the paraphrased input sentences having the largest index A4 (degree of textual similarity), as extracted paraphrased sentences. Here, since example sentences (1) and (2) have been extracted, for the example sentence (1), the paraphrased input sentence (A) having the largest index A4 is extracted as an extracted paraphrased sentence, and for the example sentence (2), the paraphrased input sentence (B) having the largest index A4 is extracted as an extracted paraphrased sentence.

Figure 8:
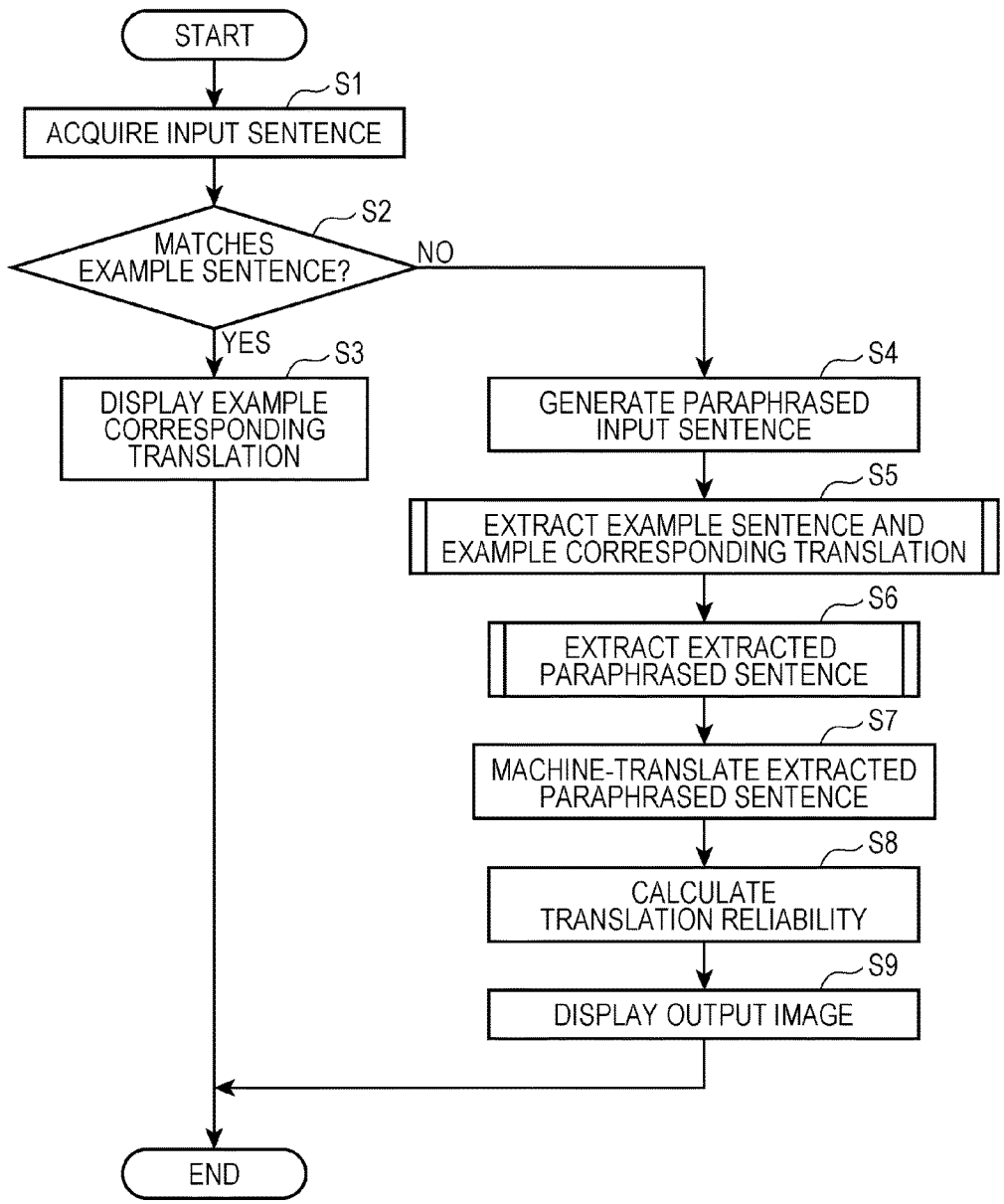
FIG. 8 is a flowchart depicting an example of processing performed by the translation support device according to an embodiment of the present disclosure.

Next, a flowchart for the translation support device 1 will be described. FIG. 8 is a flowchart depicting an example of processing performed by the translation support device 1 according to the embodiment of the present disclosure.

First, the input unit 2 receives an operation from the user and acquires an input sentence (S1). Here, it is assumed that the input sentence (I) "kadoma made takushi ni shitai" (I want to take a taxi to Kadoma) is acquired.

Next, the example match determining unit 3 determines whether or not an example sentence matching the input sentence (I) is stored in the example corresponding translation DB 4 (S2). Here, if an example sentence matching the input sentence (I) is in the example corresponding translation DB 4 (yes in S2), the example match determining unit 3 extracts an example corresponding translation for the matching example sentence from the example corresponding translation DB 4, and the output unit 9 displays the extracted example corresponding translation (S3).

However, if an example sentence matching the input sentence (I) is not stored in the example corresponding translation DB 4 (no in S2), processing proceeds to S4.

In S4, the paraphrased sentence generation unit 5 generates a plurality of paraphrased input sentences by paraphrasing the input sentence (I) using the aforementioned first to fourth paraphrasing rules (S4). The aforementioned paraphrased input sentences (A) to (C) are thereby generated, for example.

Next, the extraction unit 6 calculates the aforementioned overall evaluation values by comparing the paraphrased input sentences (A) to (C) and the example sentences stored in the example corresponding translation DB 4, and extracts n number of example corresponding translations by extracting n number of example sentences in descending order of the calculated overall evaluation values (S5). The aforementioned two example sentences (1) and (2) and example corresponding translations including said example sentences are thereby extracted, for example.

Next, the extraction unit 6 extracts n number of extracted paraphrased sentences by extracting paraphrased input sentences having the largest degree of textual similarity for each of the n number of example sentences extracted in S5, from the paraphrased input sentences generated in S4 (S6). The aforementioned two paraphrased input sentences (A) and (B) are thereby extracted as extracted paraphrased sentences, for example.

Next, the machine translation unit 7 generates n number of translated paraphrased sentences by machine-translating the n number of extracted paraphrased sentences extracted in S6, and also generates a translated input sentence by machine-translating the input sentence acquired in S1 (S7). Translated paraphrased sentences for the aforementioned two paraphrased input sentences (A) and (B) and a translated input sentence are thereby generated, for example.

Next, the reliability assigning unit 8 calculates the translation reliability of the translated input sentence and the n number of translated paraphrased sentences generated in S7 (S8). Next, the output unit 9 displays translation results including the example corresponding translations extracted in S5, the translated input sentence and the translated paraphrased sentences generated in S7, the translation reliability calculated in S8, and the like as the output image 500 (S9).

Figure 9:
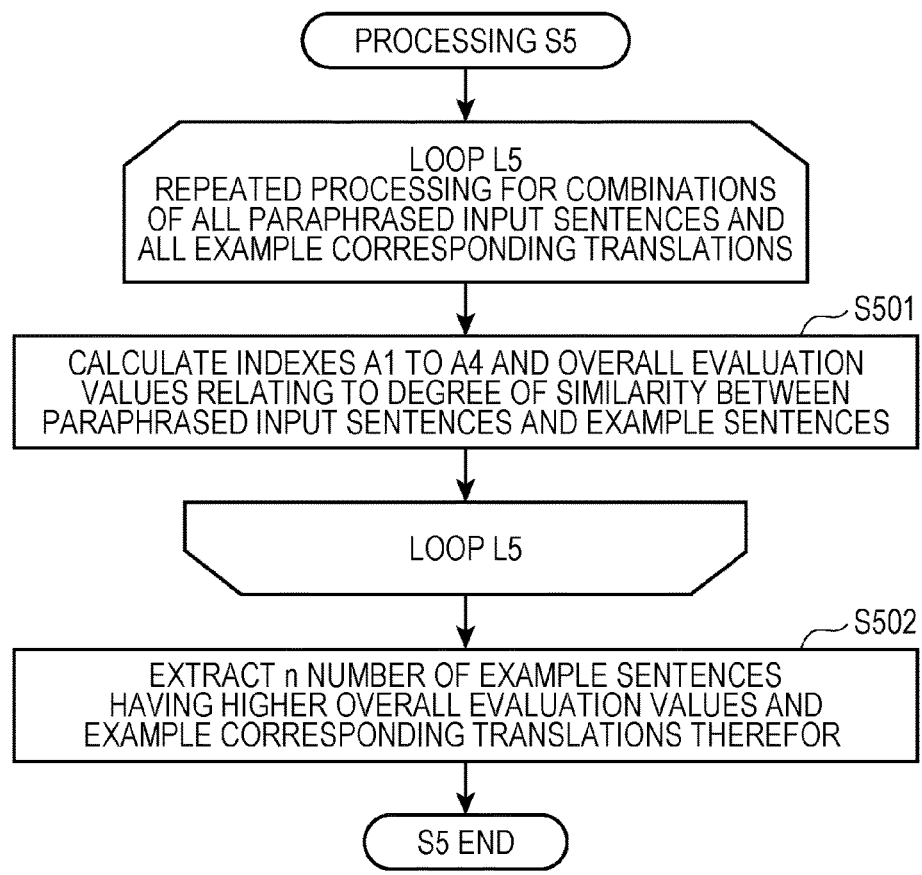
FIG. 9 is a flowchart depicting a detailed example of the processing of S5 in FIG. 8.

FIG. 9 is a flowchart depicting a detailed example of the processing of S5 in FIG. 8. Loop L5 is a loop in which the processing of S501 is repeated for each set of one paraphrased input sentence from among all of the paraphrased input sentences generated in S4 and one example corresponding translation from among all of the example corresponding translations stored in the example corresponding translation DB 4. The loop L5 ends when the processing of S501 has been executed for all of the paraphrased input sentences generated in S4 and all of the example corresponding translations stored in the example corresponding translation DB 4.

In S501, the extraction unit 6 calculates the indexes A1 to A4 for a set of one paraphrased input sentence and one example sentence. Furthermore, in S501, the extraction unit 6 calculates an overall evaluation value for one set from the calculated indexes A1 to A4.

Assuming that the paraphrased input sentences (A) to (C) have been generated in S4, first, respective overall evaluation values between the paraphrased input sentence (A) and all of the example sentences stored in the example corresponding translation DB 4 are calculated, next, respective overall evaluation values between the paraphrased input sentence (B) and all of the example sentences stored in the example corresponding translation DB 4 are calculated, and, next, respective overall evaluation values between the paraphrased input sentence (C) and all of the example sentences stored in the example corresponding translation DB 4 are calculated.

In S502, the extraction unit 6 extracts n number of example sentences having higher overall evaluation values, and n number of example corresponding translations corresponding to the n number of example sentences.

Figure 10:
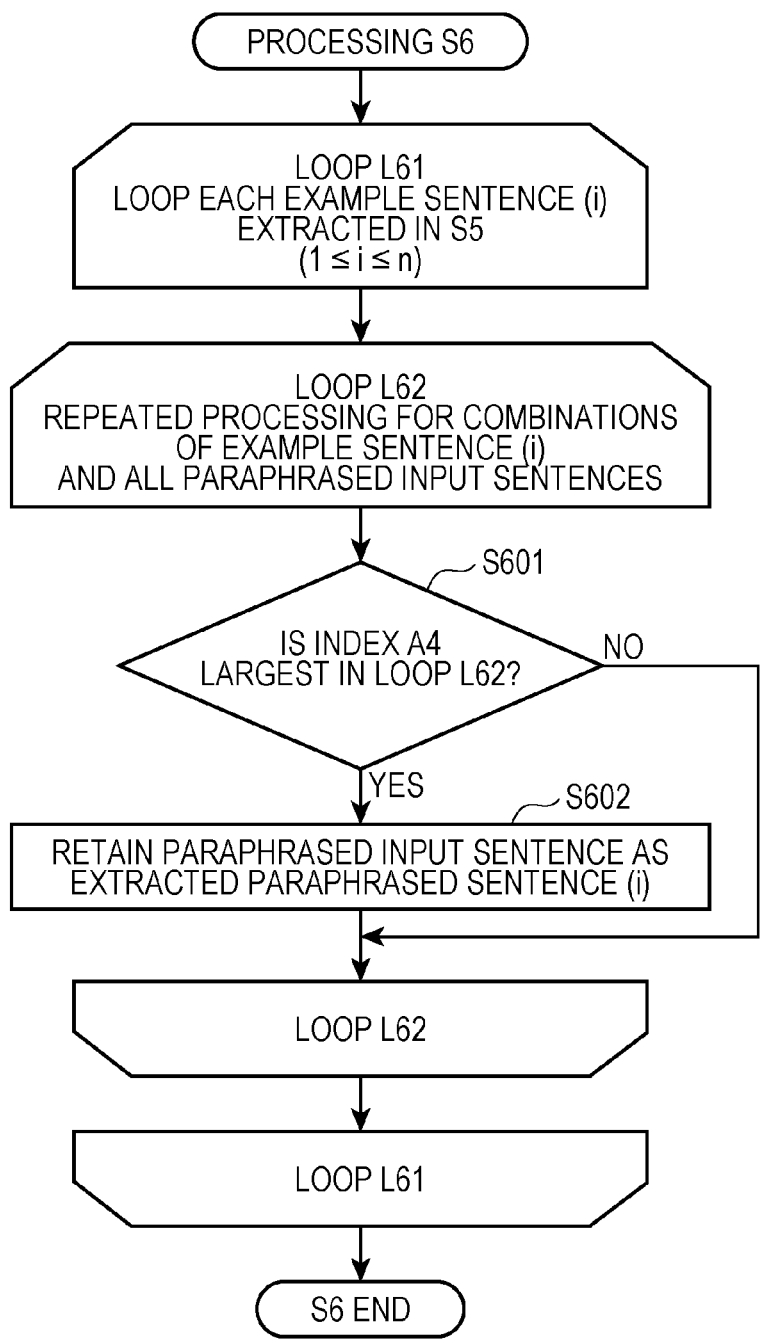
FIG. 10 is a flowchart depicting a detailed example of the processing of S6 in FIG. 8.

FIG. 10 is a flowchart depicting a detailed example of the processing of S6 in FIG. 8. Loop L61 is a loop that is executed for each one example sentence (i) from among the n number of example sentences extracted in S5, i being an index that specifies one example sentence from among the n number of example sentences, and being an integer that is equal to or greater than 1 and equal to or less than n. The end condition for the loop L61 is that the processing for the n number of example sentences has ended, in other words, that i=n. Loop L62 is a loop in which the processing of S601 and S602 is repeated for sets of one example sentence (i) and each of all of the paraphrased input sentences, in one loop of the loop L61. The end condition for the loop L62 is that the processing of S601 and S602 has ended for one example sentence (i) and each of all of the paraphrased input sentences.

In S601, the extraction unit 6 calculates the index A4 between the one example sentence (i) and one paraphrased input sentence from among all of the paraphrased input sentences. Next, if the calculated index A4 is the largest for the one example sentence (i) (yes in S601), the extraction unit 6 retains said paraphrased input sentence as an extracted paraphrased sentence (i) (S602).

However, if the calculated index A4 is not the largest for the one example sentence (i) (no in S601), the processing of S602 is not carried out and the loop L62 is continued. By repeating the loop L62, the paraphrased input sentence (i) having the largest index A4 with respect to the one example sentence (i) is determined from among all of the paraphrased input sentences. Then, by means of the loop L61, n number of paraphrased input sentences (i) having the largest index A4 with respect to n number of example sentences (i) are extracted.

For example, it is assumed that paraphrased input sentences (A) to (C) are generated in S4, and example sentences (1) to (4) are extracted in S5. In this case, first, four extracted paraphrased sentences are extracted in such a way that the paraphrased input sentence having the largest index A4 from among the paraphrased input sentences (A) to (C) for example sentence (1) is extracted as an extracted paraphrased sentence (1), and, next, the paraphrased input sentence having the largest index A4 from among the paraphrased input sentences (A) to (C) for example sentence (2) is extracted as an extracted paraphrased sentence (2).

In this way, according to the present embodiment, a translated sentence for a paraphrased input sentence is not simply presented. In other words, in the present embodiment, n number of example sentences for which the overall evaluation values for paraphrased input sentences are equal to or greater than a reference value are extracted from among the example sentences stored in the example corresponding translation DB 4, and also n number of paraphrased input sentences that are similar to the extracted n number of example sentences are extracted. Then, n number of translated paraphrased sentences obtained by machine-translating the extracted n number of paraphrased input sentences, and n number of example corresponding translations for the extracted n number of example sentences are presented.

Thus, the knowledge space that is used when generating translated sentences for an input sentence or a sentence similar thereto is used in a wide range, and translation results that are useful to the user can be presented.

Furthermore, in the present embodiment, there is no requirement for translated sentences for an input sentence or a sentence similar thereto to be generated with a high degree of reliability, and it is therefore not necessary to use a knowledge space provided with broad and abundant knowledge data so as to meet said requirement. Consequently, the present embodiment is able to present translation results that are useful to the user without having to enhance the knowledge space.

Furthermore, in the present embodiment, translated sentences for paraphrased input sentences that are similar to extracted example sentences are presented, and it is therefore possible to prevent the presenting of translation results for paraphrased input sentences having low relevance with the input sentence.

It should be noted that the following aspects can be adopted for the present disclosure.

(1) In the aforementioned embodiment, the output unit 9 displayed example corresponding translations, translation results for paraphrased input sentences, and the like using an image such as that indicated by the output image 500; however, the present disclosure is not restricted thereto, and the output unit 9 may output the content included in the output image 500 as audio. In this case, the output unit 9 is constituted by a speaker.

(2) The output image 500 depicted in FIG. 7 is an example, and in the present disclosure, any of the items depicted in FIG. 7 may be omitted from the output image 500. For example, the reference example display field 531 may be omitted and the reference translation display field 532 may be omitted in the translation support information display field 530.

(3) In the output image 500 depicted in FIG. 7, in the case where all of the translation support information display fields 520 cannot be displayed at one time, the output unit 9 may cause the output image 500 to be displayed in a scrolling manner. Thus, in the case where the display area of the display device is small, it is possible to prevent it not being possible for the user to view all of the translation support information display fields 520.

(4) In the output image 500 depicted in FIG. 7, the extracted paraphrased sentences (one or more second sentences) and the translated paraphrased sentences (fifth sentences) do not have to be displayed.

The present disclosure is able to present translated sentences that are useful to the user without enhancing the knowledge space, and is therefore useful in the technical field of providing automatic translation services.

What is claimed is:

1. A method for providing a translated sentence, the method including:
    acquiring a first sentence written in a first language which is to be translated, via a terminal of a user;
    determining whether the first sentence is included in a database including a plurality of pairs of sentences written in the first language and corresponding translated sentences written in a second language;
    in a case where it is determined that the first sentence is not included in the database, generating a plurality of second sentences obtained by replacing one or more words of the first sentence, on the basis of a predetermined rule;
    calculating respective degrees of coincidence for syntax between the plurality of second sentences and a plurality of sentences written in the first language which are included in the database;
    extracting one or more third sentences written in the first language which are included in the database and for which the calculated degree of coincidence is equal to or greater than a threshold value; and
    displaying one or more fourth sentences written in the second language which are corresponding translated sentences for the one or more third sentences in the database, on the terminal of the user as corresponding translation references for the first sentence,
    wherein one or more second sentences of the plurality of second sentences are machine-translated into the second language to generate one or more fifth sentences, and
    at least one of the one or more fourth sentences or the one or more fifth sentences is displayed on the terminal of the user.

2. The method according to claim 1,
wherein the degrees of coincidence are calculated based on a first index indicating a degree of textual similarity between the plurality of second sentences and the plurality of sentences included in the database.

3. A method for providing a translated sentence, the method including:
acquiring a first sentence written in a first language which is to be translated, via a terminal of a user;
determining whether the first sentence is included in a database including a plurality of pairs of sentences written in the first language and corresponding translated sentences written in a second language;
in a case where it is determined that the first sentence is not included in the database, generating a plurality of second sentences obtained by replacing one or more words of the first sentence, on the basis of a predetermined rule;
calculating respective degrees of coincidence for syntax between the plurality of second sentences and a plurality of sentences written in the first language which are included in the database;
extracting one or more third sentences written in the first language which are included in the database and for which the calculated degree of coincidence is equal to or greater than a threshold value; and
displaying one or more fourth sentences written in the second language which are corresponding translated sentences for the one or more third sentences in the database, on the terminal of the user as corresponding translation references for the first sentence,
wherein the degrees of coincidence are calculated based on a second index indicating a value that increases as a degree of textual similarity with the first sentence decreases, for sentences having a matching or similar sentence structure to the plurality of second sentences, of the plurality of sentences included in the database.

4. The method according to claim 1,
wherein the degrees of coincidence are calculated based on a third index indicating similarity in sentence structure between the plurality of second sentences and the plurality of sentences included in the database.

5. The method according to claim 1,
wherein the degrees of coincidence are calculated based on a fourth index indicating a value that increases as a number of matching parts of speech increases between the plurality of second sentences and the plurality of sentences included in the database.

6. The method according to claim 2,
wherein the first index indicates a value that increases as a number of replaced portions increases in the second sentences.

7. The method according to claim 1,
wherein the one or more second sentences are extracted from the plurality of second sentences on the basis of a degree of textual similarity between the plurality of second sentences and the one or more third sentences.

8. The method according to claim 1,
wherein the predetermined rule is a first paraphrasing rule with which a first word included in a fragment of the first sentence is paraphrased with a second word having a similar context relation.

9. The method according to claim 1,
wherein the predetermined rule is a second paraphrasing rule with which a first word included in a fragment of the first sentence is paraphrased into a second word having a co-occurrence relation.

10. The method according to claim 1,
wherein the predetermined rule is a third paraphrasing rule with which a first word included in a fragment of the first sentence is paraphrased into a second word having an entailment relation.

11. The method according to claim 1,
wherein the predetermined rule is a fourth paraphrasing rule with which a first word included in a fragment of the first sentence is paraphrased into a second word having a superordinate-subordinate relation.

12. The method according to claim 1,
wherein the one or more fourth sentences are presented with portions paraphrased from the first sentence being distinguished from other portions.

13. A device that provides a translated sentence, the device being provided with:
a database including a plurality of pairs of sentences written in a first language and corresponding translated sentences written in a second language;
a processor that, when executing instructions stored in a memory, performs operations including:
acquiring a first sentence written in the first language which is to be translated, via a terminal of a user;
generating, in a case where the first sentence is not included in the database, a plurality of second sentences obtained by replacing one or more words of the first sentence, on the basis of a predetermined rule;
calculating respective degrees of coincidence for syntax between the plurality of second sentences and a plurality of sentences written in the first language which are included in the database;
extracting one or more third sentences written in the first language which are included in the database and for which the calculated degree of coincidence is equal to or greater than a threshold value; and
displaying one or more fourth sentences written in the second language which are corresponding translated sentences for the one or more third sentences in the database, on the terminal of the user as corresponding translation references for the first sentence,
wherein one or more second sentences of the plurality of second sentences are machine-translated into the second language to generate one or more fifth sentences, and
at least one of the one or more fourth sentences or the one or more fifth sentences is displayed on the terminal of the user.

14. A non-transitory computer-readable recording medium storing a program for causing a computer to execute operations comprising:
acquiring a first sentence written in a first language which is to be translated, via a terminal of a user;
determining whether the first sentence is included in a database including a plurality of pairs of sentences written in the first language and corresponding translated sentences written in a second language;
in a case where it is determined that the first sentence is not included in the database, generating a plurality of second sentences obtained by replacing one or more words of the first sentence, on the basis of a predetermined rule;
calculating respective degrees of coincidence for syntax between the plurality of second sentences and a plurality of sentences written in the first language which are included in the database;
extracting one or more third sentences written in the first language which are included in the database and for which the calculated degree of coincidence is equal to or greater than a threshold value; and displaying one or more fourth sentences written in the second language which are corresponding translated sentences for the one or more third sentences in the database, on the terminal of the user as corresponding translation references for the first sentence, wherein one or more second sentences of the plurality of second sentences are machine-translated into the second language to generate one or more fifth sentences, and at least one of the one or more fourth sentences or the one or more fifth sentences is displayed on the terminal of the user.

* * * * *